US012694154B2

(12) United States Patent
Binder et al.

(10) Patent No.: US 12,694,154 B2
(45) Date of Patent: Jul. 28, 2026

(54) METHODS AND APPARATUS FOR CONTAINER ATTESTATION IN CLIENT-BASED WORKLOADS

(71) Applicant: Intel Corporation, Santa Clara, CA (US)

(72) Inventors: Garritt Binder, Loomis, CA (US); Mousumi Hazra, Vancouver, WA (US); Arvind Kumar, Beaverton, OR (US); Curtis Jutzi, Lake Oswego, OR (US); Rakshmi Bhatia, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/146,288

(22) Filed: Dec. 23, 2022

(65) Prior Publication Data

US 2023/0130746 A1 Apr. 27, 2023

(51) Int. Cl.
G06F 21/62 (2013.01)
G06F 9/50 (2006.01)
G06F 21/64 (2013.01)

(52) U.S. Cl.
CPC ........ G06F 21/6281 (2013.01); G06F 9/5016 (2013.01); G06F 21/64 (2013.01)

(58) Field of Classification Search
CPC ..... G06F 21/6281; G06F 9/5016; G06F 21/64
USPC .......................................................... 726/26
See application file for complete search history.

(56) References Cited

U.S. PATENT DOCUMENTS

| | | | | |
|---|---|---|---|---|
| 8,990,900 B2 * | 3/2015 | Edwards | ............... | H04L 63/104 |
| | | | | 726/4 |
| 2007/0061872 A1 * | 3/2007 | Carter | ................. | H04L 63/0807 |
| | | | | 726/4 |
| 2007/0271462 A1 * | 11/2007 | Bleckmann | ............. | G06F 21/57 |
| | | | | 713/176 |
| 2019/0230073 A1 * | 7/2019 | Patel | ................... | G06F 16/9014 |
| 2023/0308277 A1 * | 9/2023 | Van Cleve | .......... | H04L 63/0421 |
| 2023/0353385 A1 * | 11/2023 | Chou | .................... | H04L 9/3239 |
| 2024/0419826 A1 * | 12/2024 | Balin | ................. | G06F 21/6218 |

* cited by examiner

*Primary Examiner* — Dereena T Cattungal
(74) *Attorney, Agent, or Firm* — Hanley, Flight & Zimmerman, LLC

(57) ABSTRACT

Methods, apparatus, and systems are disclosed for container attestation in client-based workloads. An example apparatus includes at least one memory, machine readable instructions, and processor circuitry to at least one of instantiate or execute the machine readable instructions to access a container attestation and an owner policy, the container attestation including a first signature and the owner policy including a second signature, determine that the first signature and the second signature are valid, iterate through configuration sets of the owner policy to identify a match between a claim of the container attestation and a configuration set, identify a resource constraint associated with the configuration set, and generate a resource description based on the resource constraint, the resource description to determine execution of a container workload on a client-based platform.

19 Claims, 8 Drawing Sheets

200

CONTAINER VERIFICATION CIRCUITRY 110

220

CONTAINER
ATTESTATION
RECEIVER CIRCUITRY
202

SIGNATURE VERIFIER
CIRCUITRY
206

PARSING INITIATOR
CIRCUITRY
210

OWNER POLICY
RECEIVER CIRCUITRY
204

CONFIGURATION
MATCHER CIRCUITRY
208

RESOURCE
DESCRIPTION
GENERATOR
CIRCUITRY
212

DATA STORAGE
214

Figure 3:
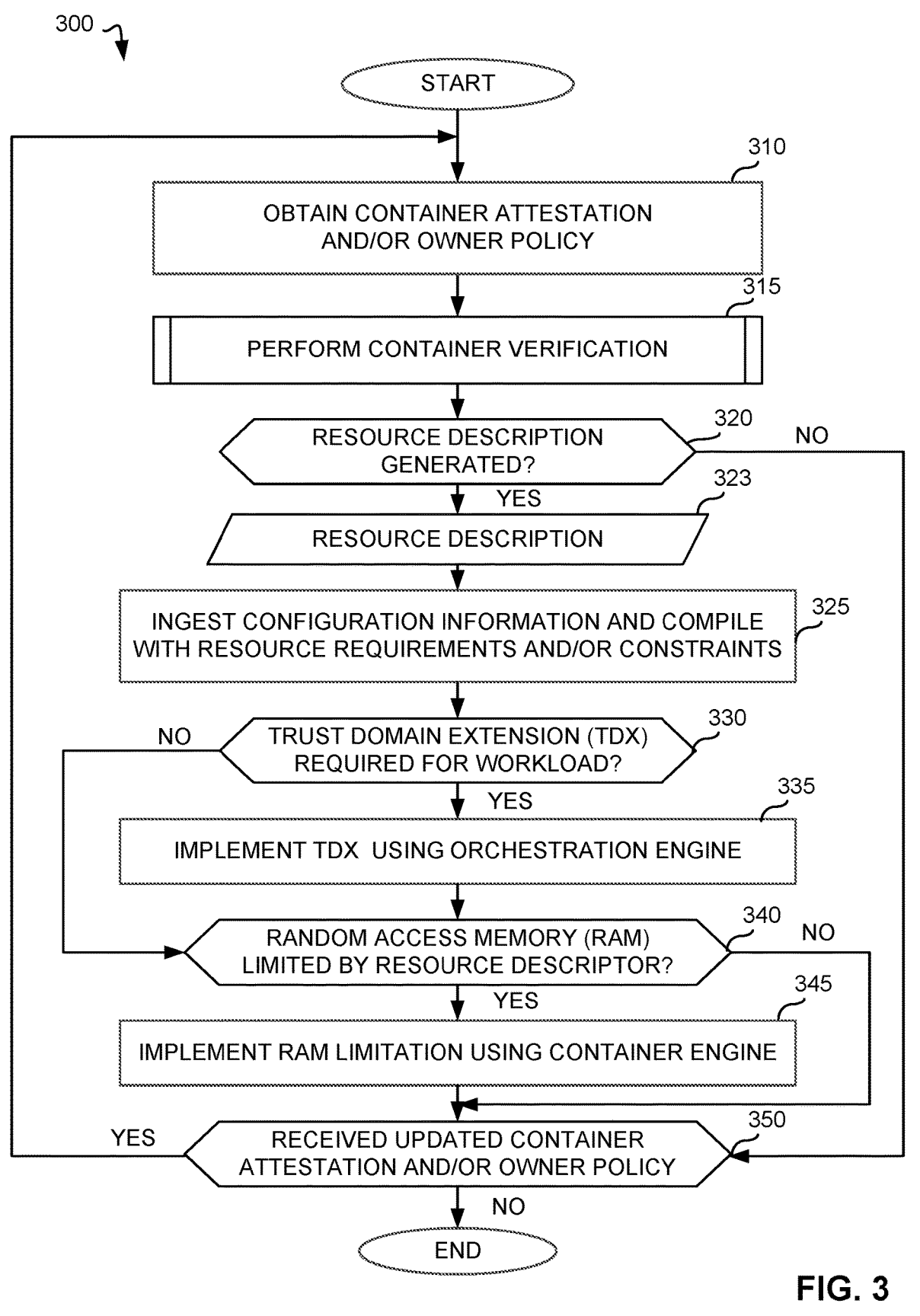

300

START

310

OBTAIN CONTAINER ATTESTATION
AND/OR OWNER POLICY

315

PERFORM CONTAINER VERIFICATION

320

RESOURCE DESCRIPTION
GENERATED?    NO

YES

323

RESOURCE DESCRIPTION

325

INGEST CONFIGURATION INFORMATION AND COMPILE
WITH RESOURCE REQUIREMENTS AND/OR CONSTRAINTS

330

NO   TRUST DOMAIN EXTENSION (TDX)
REQUIRED FOR WORKLOAD?

YES

335

IMPLEMENT TDX USING ORCHESTRATION ENGINE

340

RANDOM ACCESS MEMORY (RAM)
LIMITED BY RESOURCE DESCRIPTOR?   NO

YES

345

IMPLEMENT RAM LIMITATION USING CONTAINER ENGINE

350

YES   RECEIVED UPDATED CONTAINER
ATTESTATION AND/OR OWNER POLICY

NO

END

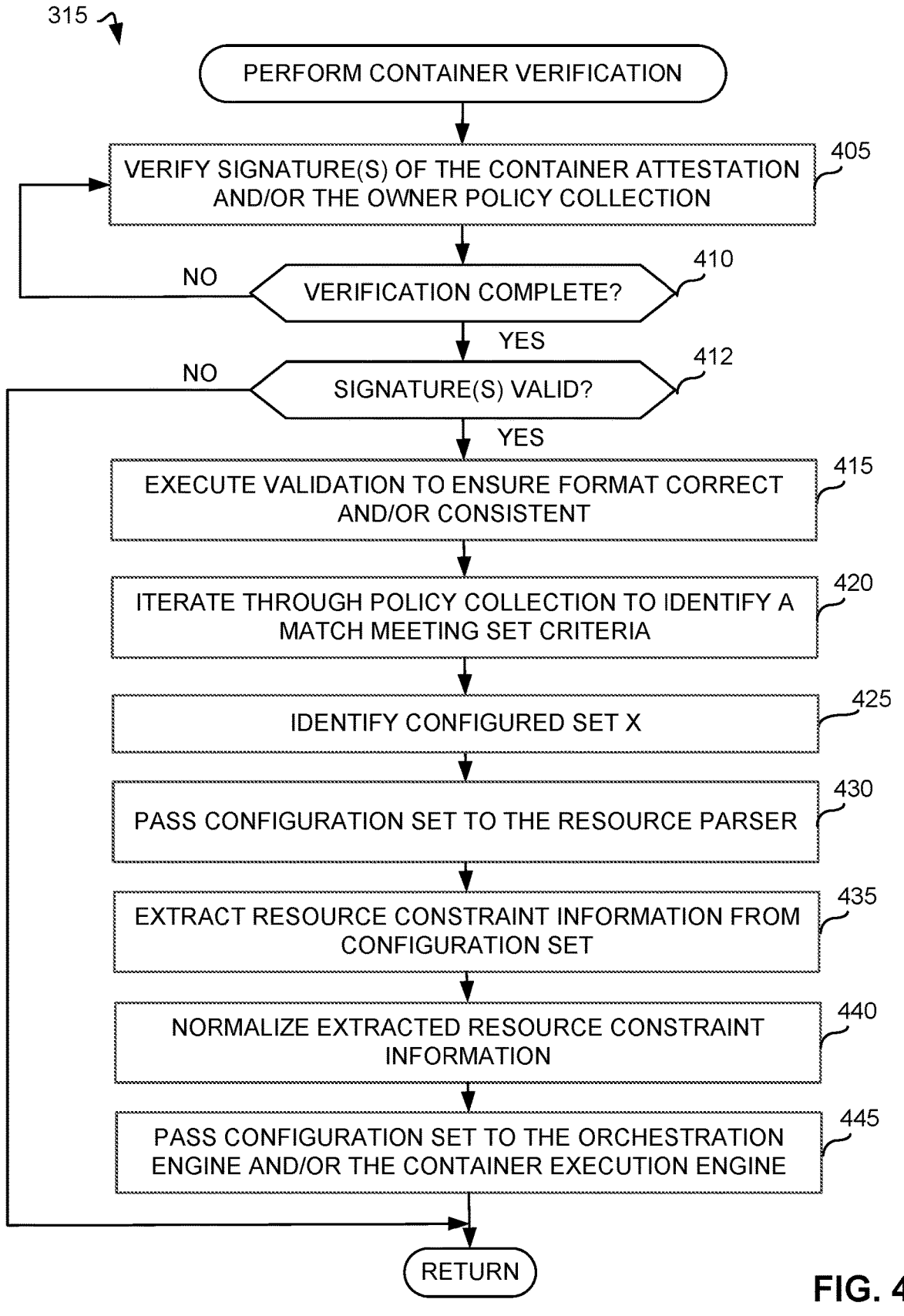

PERFORM CONTAINER VERIFICATION

VERIFY SIGNATURE(S) OF THE CONTAINER ATTESTATION AND/OR THE OWNER POLICY COLLECTION — 405

NO ← VERIFICATION COMPLETE? — 410

YES

NO ← SIGNATURE(S) VALID? — 412

YES

EXECUTE VALIDATION TO ENSURE FORMAT CORRECT AND/OR CONSISTENT — 415

ITERATE THROUGH POLICY COLLECTION TO IDENTIFY A MATCH MEETING SET CRITERIA — 420

IDENTIFY CONFIGURED SET X — 425

PASS CONFIGURATION SET TO THE RESOURCE PARSER — 430

EXTRACT RESOURCE CONSTRAINT INFORMATION FROM CONFIGURATION SET — 435

NORMALIZE EXTRACTED RESOURCE CONSTRAINT INFORMATION — 440

PASS CONFIGURATION SET TO THE ORCHESTRATION ENGINE AND/OR THE CONTAINER EXECUTION ENGINE — 445

RETURN

FIG. 4

METHODS AND APPARATUS FOR CONTAINER ATTESTATION IN CLIENT-BASED WORKLOADS

FIELD OF THE DISCLOSURE

This disclosure relates generally to software processing, and, more particularly, to methods, systems, and apparatus for container attestation in client-based workloads.

BACKGROUND

Container workloads represent standard packages of software which bundle the code of an application together with related configuration files and libraries, including dependencies required to run the application. In particular, container workloads can be used to deploy applications with increased efficiency across various multiple platform environments. In some examples, containers associated with the container workload can share the same operating system kernel while isolating application processes from the rest of the environment.

BRIEF DESCRIPTION OF THE DRAWINGS

FIG. 3 is a flowchart representative of machine-readable instructions which may be executed to implement the example container verification circuitry of FIG. 1 to perform container verification in accordance with teachings disclosed herein.

FIG. 4 is a flowchart representative of machine-readable instructions which may be executed to implement the example container verification circuitry of FIG. 1 to perform container verification in accordance with teachings disclosed herein.

Figure 1:
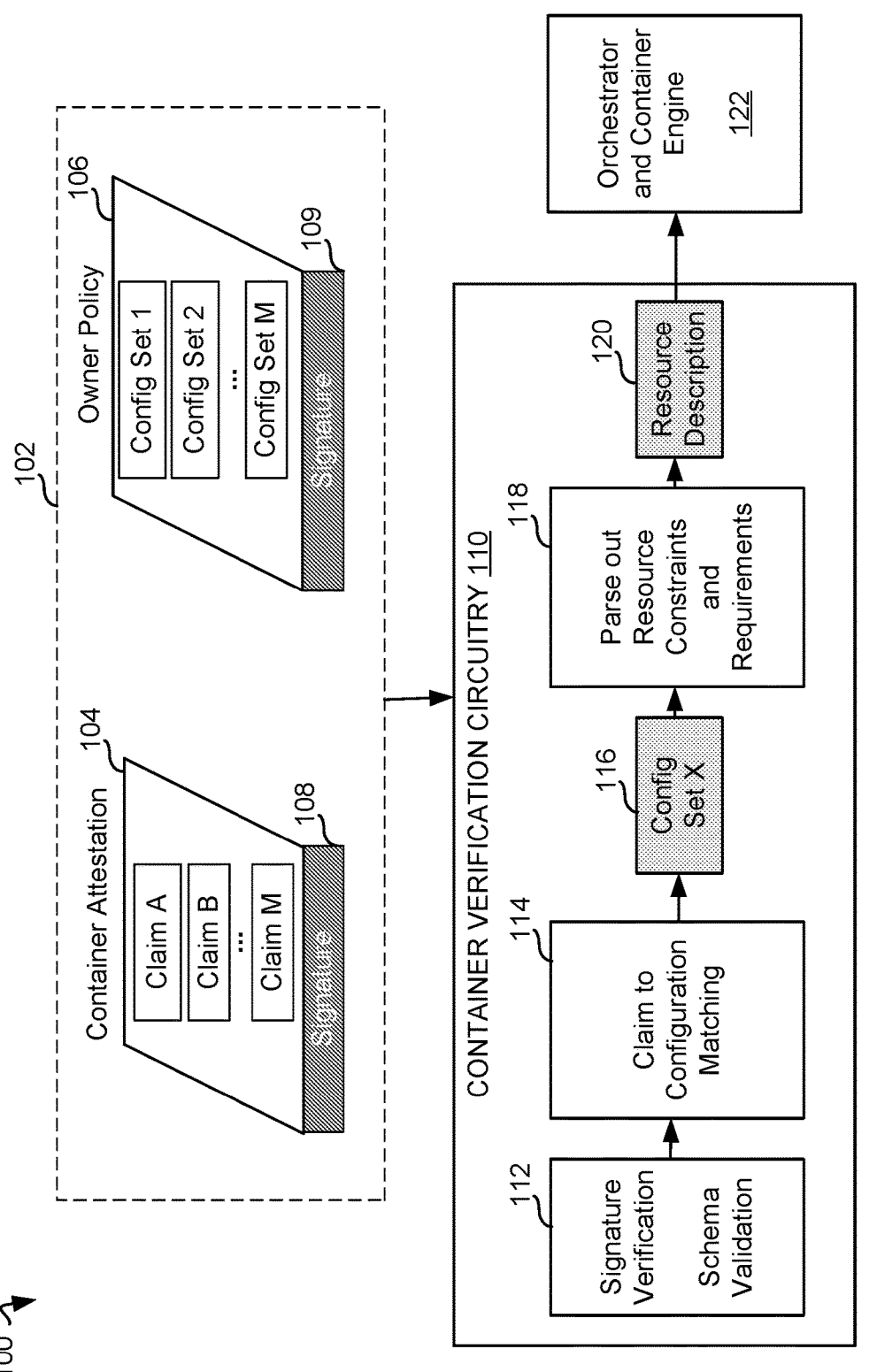
FIG. 1 is an example environment in which container verification is performed using example container verification circuitry in accordance with teachings disclosed herein.

In general, the same reference numbers will be used throughout the drawing(s) and accompanying written description to refer to the same or like parts. The figures are not to scale. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Computing system security depends on identification and elimination of malicious software (e.g., malware). Malware has a wide range of forms and variations (e.g., viruses, worms, rootkits, botnets, Trojan horses, etc.) that exploit software vulnerabilities in browsers and/or operating systems, resulting in distributed denial of service attacks (DDoS), collection of classified information, and/or other activities that compromise privacy and security. As with any other application workload running in a production environment, container workloads also require assessment for malicious content, controlled access, strong authentication, and/or assessment of shared and platform-level vulnerabilities. For example, container workloads represent standard packages of software which bundle code of an application together with related configuration files and libraries, including dependencies required to run the application. Container workloads can be used to deploy applications with increased efficiency across various multiple platform environments, given that containers can function as modular virtual machines that use minimal space on the system. As such, container workloads include an adaptable design that allows for their use across various devices and target systems, as well as across multiple cloud environments. In some examples, containers operate by sharing the kernel of the host operating system with other containers, providing isolated operating environments for a given workload while packaging only those resources (e.g., installations, code, dependencies, etc.) that are needed by applications.

In some examples, an information technology (IT) department may block container workloads from running on client platforms due to unknowns associated with container workload-based information (e.g., ownership, scanning, validation, purpose, etc.). For example, container workloads can be malicious or vulnerable. In some examples, an unsafe workload can be used as an ingress point for attackers looking to compromise the client platform and/or other accessible assets reachable from the client platform(s). Furthermore, requiring credentials and applying access control to container workloads may not be enough to mitigate potential risk of malware, given that workloads that present an interface to a user (e.g., an operator or a consumer) are potentially at risk. In some examples, container workloads can be assessed for vulnerabilities in the application layer (e.g., application logic). Any scanning that reveals areas of vulnerability can prompt the IT department to send a custom application back to a developer for further improvement and/or determine whether a patched and/or upgraded version is available (e.g., if the container workloads relate to a third-party application component). Additionally, because containers may not completely isolated and can share the same physical operating system, an attacker could exploit vulnerabilities associated with the operating system component(s), thereby compromising one or more workloads. For example, network traffic with services and/or users outside a given node traverses the host operating system, with networking between containers on a node accomplished via virtual networking. However, network traffic leaves the physical node, resulting in processing at the host operating system, where network traffic may be observed and/or captured for security and/or visibility purposes (e.g., using agents and/or plug-ins). Furthermore, in some examples, sensitive information (e.g., authorization tokens, encryption provider keys, credentials, etc.) can be inadvertently logged or displayed by workloads.

Methods and apparatus disclosed herein facilitate container attestation in client-based workloads to allow for the configuration of policy files which block some workloads from running on client platform(s). Furthermore, methods and apparatus disclosed herein can be used to control what technologies may be used (e.g., graphics processing unit) and/or are required (e.g., trust domain extension (TDX)) to execute container workloads. In examples disclosed herein, signed claims (e.g., attestation) about the container workload can be verified and reconciled against a policy of an owner prior to workload execution on a local platform. The policy of the owner is enforced and, if the workload is allowed to execute, resource limits are applied. As such, an enterprise IT department and/or an information security organization can use methods and apparatus disclosed herein to determine whether container workloads can be executed locally, instead of choosing to block all container workloads without exception. In examples disclosed herein, signatures of the container attestation and/or the owner policy collection are verified. In examples disclosed herein, a validation can be executed to ensure a correct and/or consistent format, with a final configuration set passed to a resource parser to extract resource constraint information from the configuration set and/or normalize the resource constraint information based on (1) the platform executing the workload, (2) the orchestration engine and/or (3) the container execution engine in use. Although examples disclosed herein are discussed in connection with container workloads, disclosed examples apply to malware detection and/or software validation more generally. Examples disclosed herein apply to, for instance, any other type of vulnerability, malware detection, and/or software authentication task.

FIG. 1 is an example environment 100 in which container verification is performed using example container verification circuitry 110 in accordance with teachings disclosed herein. In the example of FIG. 1, input data 102 includes container attestation data 104 and/or owner policy data 106. For example, container attestation data 104 includes a collection of claims about a specific container image (e.g., claim A, claim B, . . . , claim M). The container image represents an unchangeable, static file that includes executable code allowing the file to run an isolated process on IT infrastructure. For example, the container image allows a user to specify application dependencies and/or configurations for the application to be executed. In the example of FIG. 1, the claim(s) further specify which container image the attestation is associated with (e.g., based on a cryptographic hash of the container image). In some examples, the claims further include information such as (1) a date/time when the claims were made, (2) an identity of the attestor (e.g., third-party making the claims), (3) results of a vulnerability scan (e.g., based on a snyk test command that checks containers to identify open source vulnerabilities and/or license issues associated with the operating system and/or application dependencies), (4) data/time of the vulnerability scan along with associated scan-based metadata, and/or (5) classification of the container workload data and algorithm (e.g., based on National Institutes of Standard Technology (NIST) Special Publication (SP) 800-60, etc.). The container image can include information the container needs to execute (e.g., container engine, system libraries, utilities, configuration settings, specific workloads to run on the container, etc.).

In the example of FIG. 1, owner policy data 106 includes a collection of policy statements such as (1) criteria used to match to claims in the container attestation data 104 or matching criteria, and (2) resource constraints to implement during execution of the container workload (e.g., configuration set 1, configuration set 2, . . . , configuration set M). Examples of criteria used to match to claims can include a maximum vulnerability matching score (e.g., maximus CVSS score), an acceptable period between vulnerability scans (e.g., a maximum of 6 months), classification, and an identifier of an attestor, among others. In examples disclosed herein, resource constraints can include allowed random access memory (RAM) usage, allowed hard-drive space, allowed accelerators, trust domain extension (TDX) requirements, and other required settings and/or technologies. In the example of FIG. 1, the container attestation data 104 and/or the owner policy data 106 include signature(s) 108, 109. In examples disclosed herein, the container verification circuitry 110 can be used to verify signature 108 associated with the container attestation data 104 and/or signature 109 associated with the owner policy data 106. While in the example of FIG. 1, both the container attestation data 104 and the owner policy data 106 are present and available for processing using the container verification circuitry 110, the container attestation data 104 can be evaluated separately from the owner policy data 106 and vice versa. In some examples, the container verification circuitry 110 processes container attestation data 104 that includes signatures (e.g., requiring a signer to digitally sign the image digest and create an attestation before deployment). As such, the container verification circuitry 110 verifies the signature(s) 108 in the attestation before deploying the image(s) associated with the container attestation data 104 to an endpoint device (e.g., on a client platform).

In the example of FIG. 1, the container verification circuitry 110 performs signature verification and/or schema validation 112, configuration matching 114, configuration set selection 116, resource constraint and requirement assessment 118, and/or resource description generation 120, as described in more detail in connection with FIG. 2. For example, the container verification circuitry 110 verifies signatures associated with the container attestation data 104 and/or the owner policy data 106, and validates schema to ensure correct and/or consistent format (e.g., signature verification and/or schema validation 112). In some examples, the container verification circuitry 110 matches the owner policy collection to described criteria (e.g., configuration matching 114) and selects a configuration set that is passed (e.g., output, transmitted, sent, etc.) for further resource parsing (e.g., configuration set selection 116). For example, the container verification circuitry 110 extracts resource constraint information from the configuration set and performs normalization based on the platform executing the workload (e.g., resource constraint and requirement assessment 118), resulting in the generation of a resource description (e.g., resource description generation 120) that can be passed to an example orchestrator and container engine 122.

The orchestrator and container engine 122 automates deployment, management, scaling, and/or networking of containers. In some examples, the orchestrator and container engine 122 automates and/or manages tasks associated with provisioning and deployment of containers, configuration and scheduling, resource allocation, container availability, scaling and removing containers based on balancing workloads across a given infrastructure, load balancing and traffic routing, monitoring container performance, configuring applications based on container(s) in which the applications are executed, and maintaining security when containers interact with one another. In some examples, a container orchestration tool (e.g., Kubernetes) can be used as part of the orchestrator and container engine 122. For example, the orchestrator and container engine 122 can automatically schedule container deployment to a cluster and identify a suitable host for container deployment based on defined requirements and/or restrictions. In some examples, the orchestrator and container engine 122 manages a lifecycle of a container based on specifications associated with a compose file. The orchestrator and container engine 122 of FIG. 1 can be used for deployment, management, scaling, and/or networking of containers in any environment that runs containers (e.g., on-premise server, public cloud environment, private cloud environment, etc.).

Figure 2:
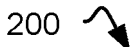
FIG. 2 is a block diagram representative of the container verification circuitry that may be implemented in the example environment of FIG. 1.

FIG. 2 is a block diagram 200 of an example implementation of container verification circuitry 110 of FIG. 2. The container verification circuitry 110 of FIG. 2 may be instantiated (e.g., creating an instance of, bring into being for any length of time, materialize, implement, etc.) by processor circuitry such as a central processing unit executing instructions. Additionally or alternatively, the container verification circuitry 110 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the example of FIG. 2, the container verification circuitry 110 includes example container attestation receiver circuitry 202, example owner policy receiver circuitry 204, example signature verifier circuitry 206, example configuration matcher circuitry 208, example parsing initiator circuitry 210, example resource description generator circuitry 212, and example data storage 214. In the example of FIG. 2, the container attestation receiver circuitry 202, the owner policy receiver circuitry 204, the signature verifier circuitry 206, the configuration matcher circuitry 208, the parsing initiator circuitry 210, the resource description generator circuitry 212, and/or the data storage 214 are in communication via an example bus 220.

The container attestation receiver circuitry 202 receives (e.g., retrieves, obtains, accesses, etc.) the container attestation data 104. In some examples, the container attestation is derived from the creator(s) of the container (e.g., downloadable via the Internet and/or the network). A signed container attestation can be considered valid from any source if the signature is verifiable. In some examples, cached copies (e.g., stored on a local file system) are valid, but may be older. In some examples, a local cashed copy can be used if a newer copy is not available. The container attestation receiver circuitry 202 accesses data associated with a container attestation, including a collection of claims about a specific container image (e.g., claim A, claim B, etc.), as described in connection with FIG. 1. The container attestation receiver circuitry 202 may identify and/or determine which container image the attestation is associated with (e.g., based on a cryptographic hash of the container image). In some examples, the container attestation receiver circuitry 202 identifies and/or determines additional information associated with the container attestation data 104 (e.g., date/time when the claims were made, identity of the attestor, results of a vulnerability scan, etc.).

The owner policy receiver circuitry 204 receives the owner policy data 106. In some examples, the owner policy can be accessed from different sources, but is produced by an owner of the asset. For example, the owner policy can be placed on a hard drive by the IT organization or accessed from a local repository (e.g., local within the enterprise). In examples disclosed herein, the owner policy can be deemed valid if signed and not expired (e.g., such that using a cached copy is acceptable). For example, the owner policy receiver circuitry 204 retrieves information related to the criteria used to match to claims in the container attestation data 104. In some examples, owner policy receiver circuitry 204 identifies resource constraints for implementation during execution of the container workload (e.g., configuration set 1, configuration set 2, etc.). For example, the owner policy receiver circuitry 204 determines a maximum vulnerability matching score and/or an acceptable period between vulnerability scans based on a policy of an owner, as described in connection with FIG. 1. In some examples, the owner policy receiver circuitry 204 identifies random access memory (RAM) usage, hard-drive space limitations and/or trust domain extension (TDX) requirements based on the owner policy data 106.

The signature verifier circuitry 206 verifies the validity of signature(s) 108, 109 associated with the container attestation data 104 and/or the owner policy data 106. In some examples, the signature verifier circuitry 206 verifies the signature(s) 108 in the attestation before deploying the image(s) associated with the container attestation data 104 to the configuration matcher circuitry 208. In some examples, the signature verifier circuitry 206 verifies the signature(s) 109 in the owner policy to validate a signer's identity. The signature verifier circuitry 206 can verify the signature(s) using any verification technique. For example, verification of the signature(s) 108, 109 permits further validation that the format used is correct and consistent. In some examples, prior to workload execution on the local platform, the claims can be verified and reconciled against a policy of an owner. In some examples, the container verification circuitry 110 completes and/or terminates the verification process if the signature verifier circuitry 206 identifies and/or determines that the signature(s) 108, 109 are invalid.

The configuration matcher circuitry 208 accesses the owner policy data 106 to perform a matching protocol to identify an owner policy collection that matches criteria associated with claims of the container attestation (e.g., an identifier of an attestor, time period for a vulnerability scan, etc.). Configurations categorize claims to identify under which conditions the container workload can be executed (e.g., dealing with sensitive data would result in the use of a trusted domain, etc.). For example, the configuration matcher circuitry 208 identifies and/or determines a con-figuration set (e.g., configuration set 1, configuration set 2, etc.) associated with the owner policy data 106 by process-ing the owner's policy data. In some examples, the configu-ration matcher circuitry 208 identifies and/or determines a suitable configuration (e.g., configuration set 2) based on the claims identified as part of the container attestation data 104 (e.g., the configuration matcher circuitry 208 identifies the best configuration set match based on the claims that have been made). For example, the configuration set determines an amount of memory (e.g., RAM) that can be utilized for a given container workload, including access permissions (e.g., access to a graphics processing unit (GPU), network access permissions, etc.). Subsequently, the configuration matcher circuitry 208 can identify and/or select a configu-ration set that is passed (e.g., forwarded, transmitted, output, etc.) to the parsing initiator circuitry 210 (e.g., configuration set X shown as part of the configuration set selection 116 in connection with FIG. 1).

The parsing initiator circuitry 210 extracts resource con-straint information (e.g., RAM limitations, access restric-tions, etc.) from the configuration set and/or normalizes the resource constraint information based on the platform executing the container workload. In some examples, the parsing initiator circuitry 210 normalizes the resource con-straint information based on the orchestration engine and/or container execution engine in use (e.g., open-source con-tainer orchestration system such as Kubernetes, etc.).

The resource description generator circuitry 212 gener-ates the resource description file (e.g., resource description generation 120 of FIG. 1) that can be processed by the orchestration engine and/or container execution engine in use (e.g., orchestrator and container engine 122). For example, the description generator circuitry 212 generates the resource description file to include information related to attributes of the central processing unit (CPU) required for the container, attributes of the memory resources required for the container, as well as attributes of the graphics processing unit (GPU) resources, volumes used by the container, and/or implementation-specific extended resource requirements.

The data storage 214 can be used to store any information associated with the container attestation receiver circuitry 202, the owner policy receiver circuitry 204, the signature verifier circuitry 206, the configuration matcher circuitry 208, the parsing initiator circuitry 210, and/or the resource description generator circuitry 212. The example data stor-age 214 of the illustrated example of FIG. 2 can be imple-mented by any memory, storage device and/or storage disc for storing data such as flash memory, magnetic media, optical media, etc. Furthermore, the data stored in the example data storage 214 can be in any data format such as binary data, comma delimited data, tab delimited data, structured query language (SQL) structures, image data, etc.

In some examples, the apparatus includes means for receiving container attestation data. For example, the means for receiving container attestation data may be implemented by container attestation receiver circuitry 202. In some examples, the container attestation receiver circuitry 202 may be instantiated by processor circuitry such as the example processor circuitry 512 of FIG. 5. For instance, the container attestation receiver circuitry 202 may be instanti-ated by the example microprocessor 600 of FIG. 6 executing machine executable instructions such as those implemented by at least block 310, 315 of FIG. 3. In some examples, the container attestation receiver circuitry 202 may be instanti-ated by hardware logic circuitry, which may be implemented by an ASIC, XPU, or the FPGA circuitry 700 of FIG. 7 structured to perform operations corresponding to the machine readable instructions. Additionally or alternatively, the container attestation receiver circuitry 202 may be instantiated by any other combination of hardware, software, and/or firmware. For example, the container attestation receiver circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firm-ware, but other structures are likewise appropriate.

In some examples, the apparatus includes means for receiving owner policy data. For example, the means for receiving owner policy data may be implemented by owner policy receiver circuitry 204. In some examples, the owner policy receiver circuitry 204 may be instantiated by proces-sor circuitry such as the example processor circuitry 512 of FIG. 5. For instance, the owner policy receiver circuitry 204 may be instantiated by the example microprocessor 600 of FIG. 6 executing machine executable instructions such as those implemented by at least block 310, 315 of FIG. 3. In some examples, the owner policy receiver circuitry 204 may be instantiated by hardware logic circuitry, which may be implemented by an ASIC, XPU, or the FPGA circuitry 700 of FIG. 7 structured to perform operations corresponding to the machine readable instructions. Additionally or alterna-tively, the owner policy receiver circuitry 204 may be instantiated by any other combination of hardware, software, and/or firmware. For example, the owner policy receiver circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine read-able instructions without executing software or firmware, but other structures are likewise appropriate.

In some examples, the apparatus includes means for verifying a signature. For example, the means for verifying a signature may be implemented by signature verifier circuitry 206. In some examples, the signature verifier circuitry 206 may be instantiated by processor circuitry such as the example processor circuitry 512 of FIG. 5. For instance, the signature verifier circuitry 206 may be instantiated by the example microprocessor 600 of FIG. 6 executing machine executable instructions such as those implemented by at least block 405 of FIG. 4. In some examples, the signature verifier circuitry 206 may be instantiated by hardware logic circuitry, which may be implemented by an ASIC, XPU, or the FPGA circuitry 700 of FIG. 7 structured to perform operations corresponding to the machine readable instructions. Additionally or alternatively, the signature verifier circuitry 206 may be instantiated by any other combination of hardware, software, and/or firmware. For example, the signature verifier circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for configuration matching. For example, the means for configuration matching may be implemented by configuration matcher circuitry 208. In some examples, the configuration matcher circuitry 208 may be instantiated by processor circuitry such as the example processor circuitry 512 of FIG. 5. For instance, the configuration matcher circuitry 208 may be instantiated by the example microprocessor 600 of FIG. 6 executing machine executable instructions such as those implemented by at least block 420 of FIG. 4. In some examples, the configuration matcher circuitry 208 may be instantiated by hardware logic circuitry, which may be implemented by an ASIC, XPU, or the FPGA circuitry 700 of FIG. 7 structured to perform operations corresponding to the machine readable instructions. Additionally or alternatively, the configuration matcher circuitry 208 may be instantiated by any other combination of hardware, software, and/or firmware. For example, the configuration matcher circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for parsing. For example, the means for parsing may be implemented by parsing initiator circuitry 210. In some examples, the parsing initiator circuitry 210 may be instantiated by processor circuitry such as the example processor circuitry 512 of FIG. 5. For instance, the parsing initiator circuitry 210 may be instantiated by the example microprocessor 600 of FIG. 6 executing machine executable instructions such as those implemented by at least block 435, 440 of FIG. 4. In some examples, the parsing initiator circuitry 210 may be instantiated by hardware logic circuitry, which may be implemented by an ASIC, XPU, or the FPGA circuitry 700 of FIG. 7 structured to perform operations corresponding to the machine readable instructions. Additionally or alternatively, the parsing initiator circuitry 210 may be instantiated by any other combination of hardware, software, and/or firmware. For example, the parsing initiator circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating a resource description. For example, the means for generating a resource description may be implemented by resource description generator circuitry 212. In some examples, the resource description generator circuitry 212 may be instantiated by processor circuitry such as the example processor circuitry 512 of FIG. 5. For instance, the resource description generator circuitry 212 may be instantiated by the example microprocessor 600 of FIG. 6 executing machine executable instructions such as those implemented by at least block 445 of FIG. 4. In some examples, the resource description generator circuitry 212 may be instantiated by hardware logic circuitry, which may be implemented by an ASIC, XPU, or the FPGA circuitry 700 of FIG. 7 structured to perform operations corresponding to the machine readable instructions. Additionally or alternatively, the resource description generator circuitry 212 may be instantiated by any other combination of hardware, software, and/or firmware. For example, the resource description generator circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the container verification circuitry 110 of FIG. 1 is illustrated in FIG. 2, one or more of the elements, processes and/or devices illustrated in FIG. 2 may be combined, divided, re-arranged, omitted, eliminated and/or implemented in any other way. Further, the example container attestation receiver circuitry 202, example owner policy receiver circuitry 204, example signature verifier circuitry 206, example configuration matcher circuitry 208, example parsing initiator circuitry 210, example resource description generator circuitry 212, and/or, more generally, the example container verification circuitry 110 of FIG. 2 may be implemented by hardware, software, firmware and/or any combination of hardware, software and/or firmware. Thus, for example, any of example container attestation receiver circuitry 202, example owner policy receiver circuitry 204, example signature verifier circuitry 206, example configuration matcher circuitry 208, example parsing initiator circuitry 210, example resource description generator circuitry 212, and/or, more generally, the example container verification circuitry 110 of FIG. 2 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example container verification circuitry 110 of FIG. 2 may include one or more elements, processes, and/or devices in addition to, or instead of, those illustrated in FIG. 2, and/or may include more than one of any or all of the illustrated elements, processes and devices.

Flowcharts representative of example machine readable instructions, which may be executed to configure processor circuitry to implement the container verification circuitry 110 of FIG. 1 are shown in FIGS. 3-4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3-4, many other methods of implementing the example container verification circuitry 110 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine-readable instructions and/or operations 300 which may be executed and/or instantiated by processor circuitry to implement the example container verification circuitry 110 of FIG. 1. The machine readable instructions and/or the operations 300 of FIG. 3 begin at block 310, at which the container attestation receiver circuitry 202 and/or the owner policy receiver circuitry 204 receive the container attestation data 104 and/or the owner policy data 106. The container verification circuitry 110 of FIG. 1 performs container verification using the received container attestation data 104 and/or the owner policy data 106 (block 315), as described in more detail in connection with FIG. 4. For example, the container verification circuitry 110 identifies and outputs a resource description (e.g., based on the claims of the container attestation 104 and/or the configuration set of the owner policy 106) including resource constraint information for further processing by the orchestrator and/or container engine 122 of FIG. 1. As part of the container verification performed by the container verification circuitry 110 in connection with FIG. 4, the container verification circuitry 110 determines whether signature(s) associated with the container attestation 104 and/or the owner policy 106 are valid (e.g., signature(s) 108, 109). When the container verification circuitry 110 determines that the signature(s) are valid, a resource description can be generated (block 320). However, if the signature(s) are invalid and the resource description is not generated, control proceeds to block 350, at which the container verification circuitry 110 determines whether an updated container attestation and/or owner policy has been received (block 350). For example, new container attestation(s) 104 can be produced at a set interval of time (e.g., once a month, etc.) for a particular application.

After the container verification circuitry 110 generates the resource description, the orchestrator and/or container engine 122 ingests and/or processes the configuration information associated with the resource description and deploys and/or compiles a container workload to the client platform based on the identified resource requirements and/or constraints (block 325). After deploying the container workload, the orchestrator and/or container engine 122 determines whether sensitive information requires the use of a trusted domain (e.g., a trusted domain extension (TDX)) (block 330). If the configuration information associated with the resource description generated using the container verification circuitry 110 indicates that a trusted domain is needed to deploy the container workload, the orchestrator engine implements the trusted domain (e.g., TDX) (block 335). In some examples, the resource description generated at block 315 indicates a limit on the random access memory (RAM) associated with the deployment of the container workload (block 340). If the orchestrator and/or container engine 122 identifies a memory restriction from the resource description, the container engine 122 implements a RAM limitation (block 345). In some examples, the container verification circuitry 110 identifies and/or determines whether updated container attestation and/or owner policy is available for processing (block 350). If updated container attestation and/or owner policy is available, the container verification circuitry 110 proceeds to perform container verification (block 315). As such, the container verification circuitry 110 performs verification of container workloads that could otherwise contain malware and/or introduce vulnerabilities into the host system if such container workloads are not assessed prior to deployment. For example, container workloads typically run in the cloud environment on servers and can be part of a bigger application that forms a variety of smaller cloud-based applications. Bringing select containers down to a client-based environment can be useful for benefitting from video and/or audio source(s) and/or other data source(s) located in the client and/or taking advantage of local graphics or acceleration hardware. However, lack of container verification can create a risk for owners of the client laptop and/or workstation, given the possibility of the container workload containing malware that can reach out into an enterprise where the system is running and/or attack other systems. Given the presence of such a security risk, the IT department may decide not to allow any containerized workloads to run without exception, thereby eliminating the use of any container workloads in the client-based environment. Methods and apparatus disclosed herein permit an owner of a client device to decide what type(s) of workloads can run in the client environment based on attributes of the container workload (e.g., time since last vulnerability scan, etc.). As such, the IT department can obtain greater control over deployment of container workload(s) running on a client platform. As such, container workloads can be utilized as often as it is beneficial for an enterprise to do so (e.g., using a conference call plug-in to help process video and/or audio on the client platform while filtering out noise and/or reducing any background video that goes into the cloud environment, etc.). Likewise, methods and apparatus disclosed herein permit the deployment of multiple container workloads to run consistently on the client platform (e.g., using a speech text container workload that runs more efficiently on the client platform as opposed to the cloud environment).

FIG. 4 is a flowchart representative of machine-readable instructions 315 which may be executed to implement the example container verification circuitry 110 of FIG. 1 to perform container verification in accordance with teachings disclosed herein. In the example of FIG. 4, the signature verifier circuitry 206 verifies whether the signature(s) of the container attestation 104 and/or the owner policy 106 collection (e.g., signature(s) 108, 109 of FIG. 1) are valid (block 405). For example, the signature verifier circuitry 206 determines whether the signature(s) 108, 109 associated with the container attestation and/or the owner policy collection are valid using a validation protocol. After verification completes (block 410), the signature verifier circuitry 206 confirms that the signature(s) are valid and/or invalid (block 412). If the signature(s) are valid, the signature verifier circuitry 206 performs validation protocol to ensure a correct and/or consistent format of the container attestation 104 and/or the owner policy 106 associated with the signature(s) 108, 109 (block 415). For example, the signature verifier circuitry 206 checks the format and/or consistency of claims included in the container attestation 104 and/or configuration sets included in the owner policy 106. After verification is completed, the configuration matcher circuitry 208 iterates through the owner policy 106 collection of configuration sets to identify a match meeting set criteria (block 420). For example, the configuration matcher circuitry 208 accesses the owner policy 106 to perform a matching protocol to identify an owner policy collection (e.g., a configured set) that matches criteria associated with claims of the container attestation 104 (e.g., an identifier of the attestor, time period for a vulnerability scan, etc.). The configuration matcher circuitry 208 identifies and/or selects a configuration set (e.g., configured set X at block 425) that matches the criteria associated with claims of the container attestation 104 that is passed (e.g., output, transmitted, sent, etc.) to the parsing initiator circuitry 210 (block 430). In some examples, the configuration set determines an amount of memory (e.g., RAM) that can be utilized for a given container workload, including access permissions (e.g., access to a graphics processing unit (GPU), network access permissions, etc.)). The parsing initiator circuitry 210 extracts resource constraint information from the configuration set (e.g., configuration set X) (block 435) and/or normalizes the resource constraint information (block 440).

For example, the parsing initiator circuitry 210 normalizes the resource constraint information based on the platform executing the container workload as well as the orchestration engine and/or the container execution engine in use (e.g., orchestrator and container engine 122 of FIG. 1). In the example of FIG. 4, the resource description generator circuitry 212 generates the resource description for passing of the configuration set to the orchestrator and container engine 122 of FIG. 1 (block 445). For example, the resource description generator circuitry 212 generates the resource description in a format that can be processed by the orchestrator and container engine 122. In some examples, the execution of the container workload is blocked if the signature is invalid.

Figure 5:
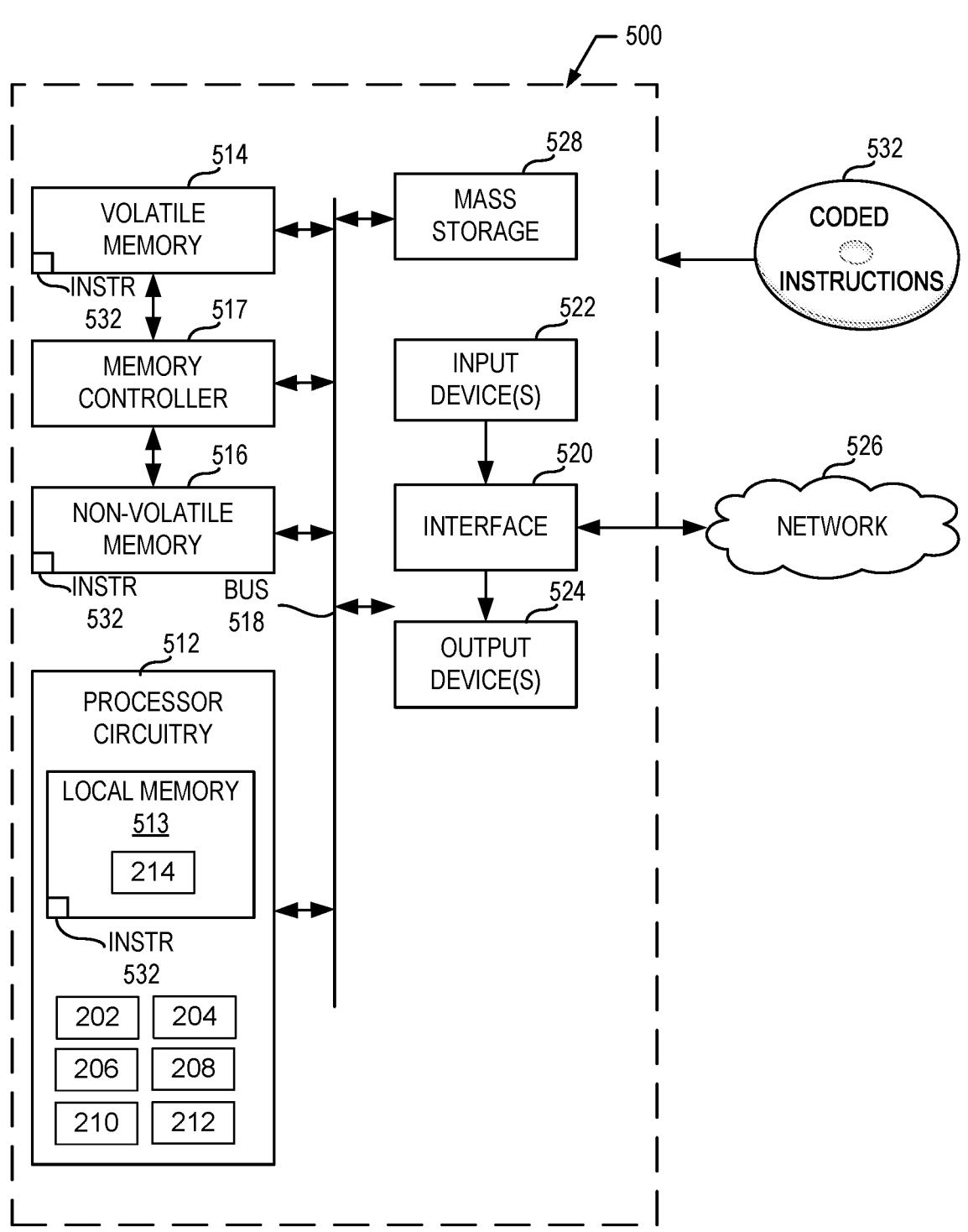
FIG. 5 is a block diagram of an example processing platform structured to execute the instructions of FIGS. 3-4 to implement the example container verification circuitry of FIG. 1 to perform container verification in accordance with teachings disclosed herein.

FIG. 5 is a block diagram of an example processor platform 500 structured to execute and/or instantiate the machine readable instructions and/or operations of FIGS. 3-4 to implement the example container verification circuitry 110. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the container attestation receiver circuitry 202, the owner policy receiver circuitry 204, the signature verifier circuitry 206, the configuration matcher circuitry 208, the parsing initiator circuitry 210, and/or the resource description circuitry 212.

The processor circuitry 512 of the illustrated example includes a local memory 513 (e.g., a cache, registers, etc.). In the example of FIG. 5, the local memory 513 implements the example data storage 214 of FIG. 2. However, any of the example memories 514, 516 may implement all or part of the example data storage 216 of FIG. 2. The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output devices 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 532, which may be implemented by the machine readable instructions of FIGS. 3 and/or 4, may be stored in the mass storage device 528, in the volatile memory 514, in the non-volatile memory 516, and/or on a removable non-transitory computer readable storage medium such as a CD or DVD.

Figure 6:
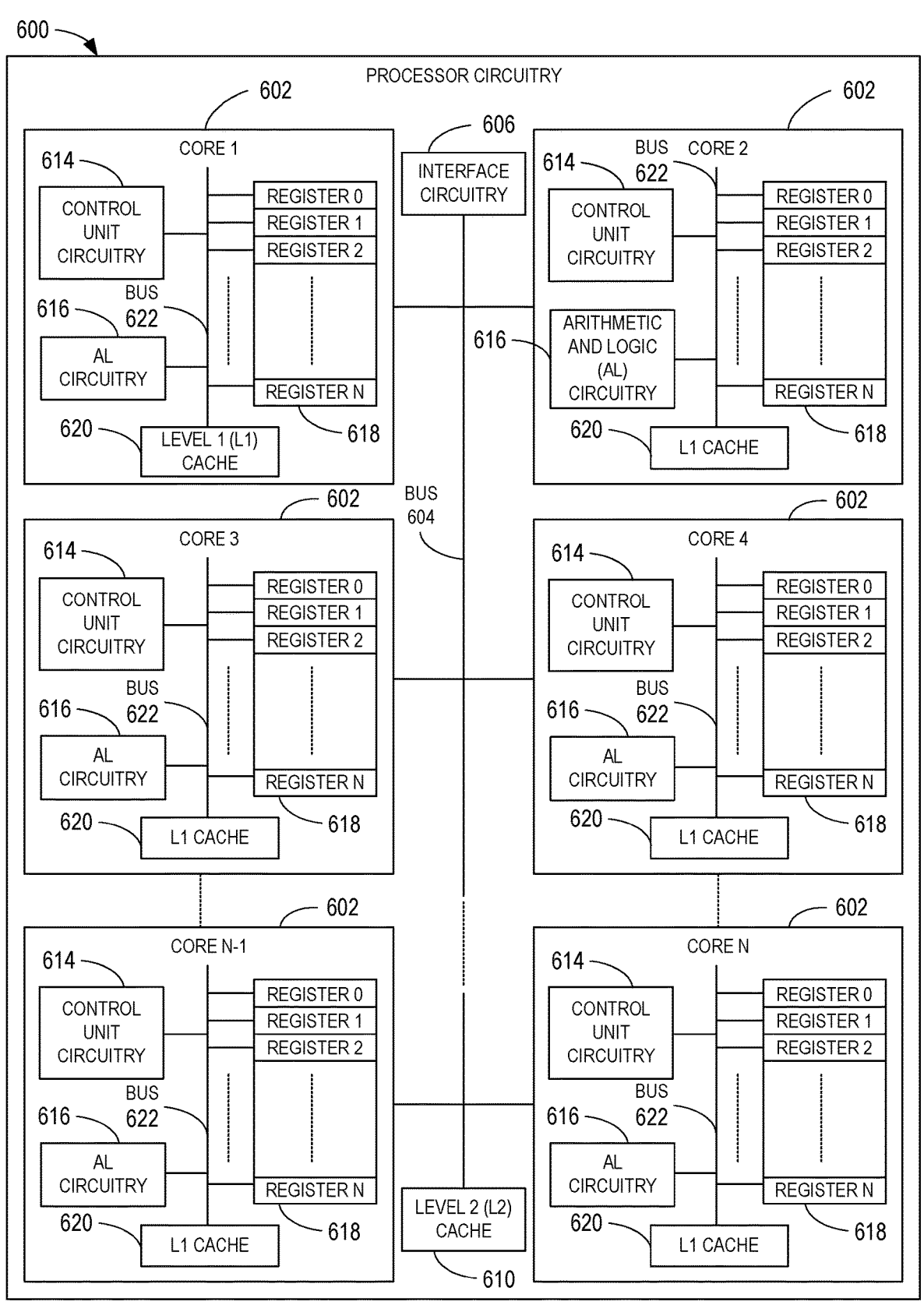
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowchart of FIGS. 3 and/or 4 to effectively instantiate the circuitry of FIG. 2 logic circuits to perform the operations corresponding to those machine readable instructions. In some such examples, the circuitry of FIG. 2 is instantiated by the hardware circuits of the microprocessor 600 in combination with the instructions. For example, the microprocessor 600 may implement multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3 and/or 4.

The cores 602 may communicate by an example bus 604. In some examples, the bus 604 may implement a communication bus to effectuate communication associated with one(s) of the cores 602. For example, the bus 604 may implement at least one of an Inter-Integrated Circuit (I2C) bus, a Serial Peripheral Interface (SPI) bus, a PCI bus, or a PCIe bus. Additionally or alternatively, the bus 604 may implement any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2_cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the L1 cache 620, and an example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer-based operations. In other examples, the AL circuitry 616 also performs floating point operations. In yet other examples, the AL circuitry 616 may include first AL circuitry that performs integer-based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register (s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may be implemented by at least one of an I2C bus, a SPI bus, a PCI bus, or a PCIe bus.

Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
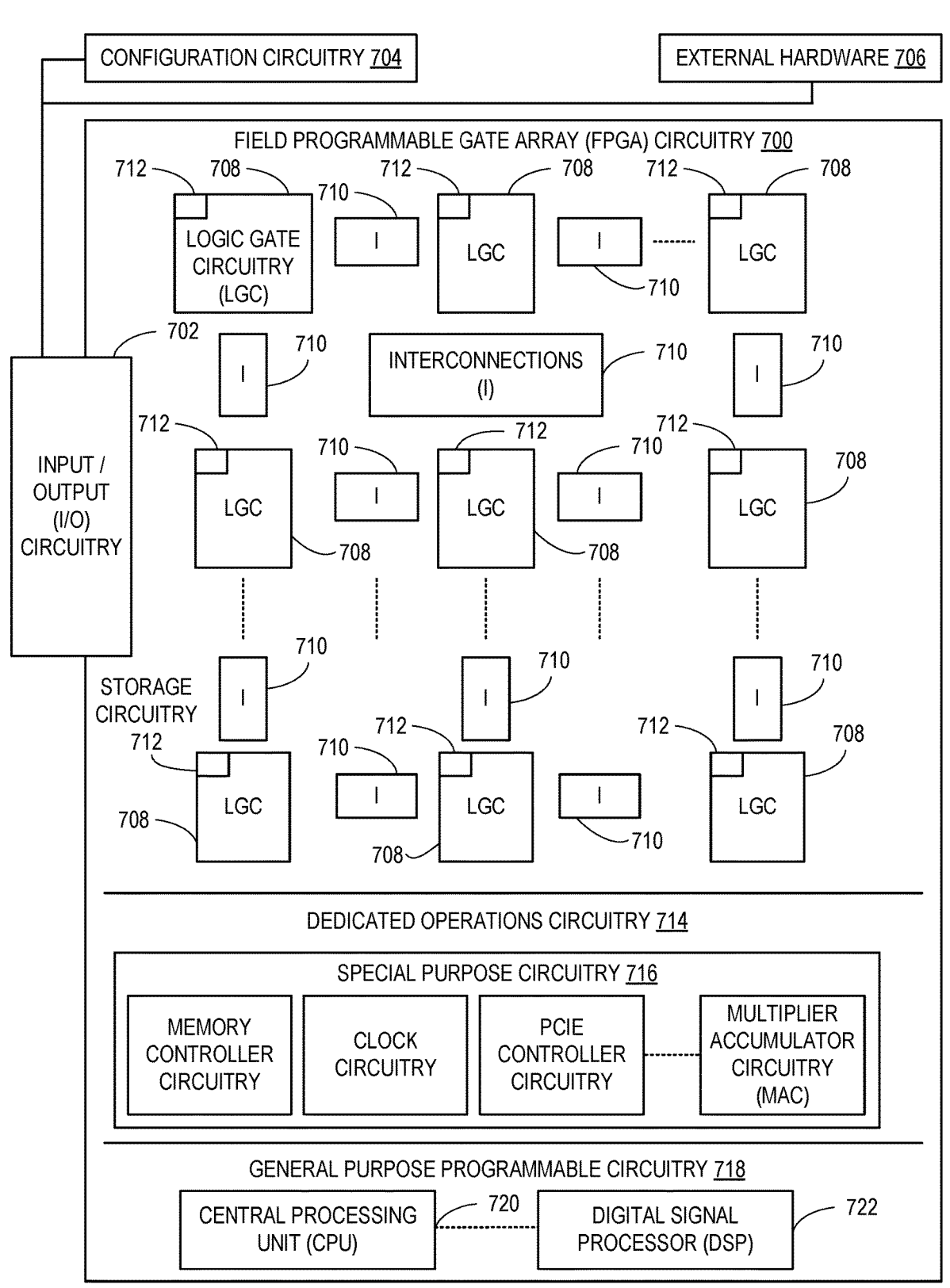
FIG. 7 is a block diagram of another example implementation of the processor circuitry of FIG. 5.

FIG. 7 is a block diagram of another example implementation of the processor circuitry of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowcharts of FIGS. 3 and/or 4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts of FIGS. 3 and/or 4. In particular, the FPGA 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowcharts of FIGS. 3 and/or 4. As such, the FPGA circuitry 700 may be structured to effectively instantiate some or all of the machine readable instructions of the flowcharts of FIGS. 3 and/or 4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIGS. 3 and/or 4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may implement interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 700 of FIG. 7. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIGS. 3 and/or 4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowchart of FIGS. 3 and/or 4 may be executed by one or more of the cores 602 of FIG. 6, a second portion of the machine readable instructions represented by the flowcharts of FIGS. 3 and/or 4 may be executed by the FPGA circuitry 700 of FIG. 7, and/or a third portion of the machine readable instructions represented by the flowcharts of FIGS. 3 and/or 4 may be executed by an ASIC. It should be understood that some or all of the circuitry of FIG. 5 may, thus, be instantiated at the same or different times. Some or all of the circuitry may be instantiated, for example, in one or more threads executing concurrently and/or in series. Moreover, in some examples, some or all of the circuitry of FIG. 5 may be implemented within one or more virtual machines and/or containers executing on the microprocessor.

In some examples, the processor circuitry 512 of FIG. 5 may be in one or more packages. For example, the processor circuitry 600 of FIG. 6 and/or the FPGA circuitry 700 of FIG. 7 may be in one or more packages. In some examples, an XPU may be implemented by the processor circuitry 512 of FIG. 5 which may be in one or more packages. For example, the XPU may include a CPU in one package, a DSP in another package, a GPU in yet another package, and an FPGA in still yet another package.

Figure 8:
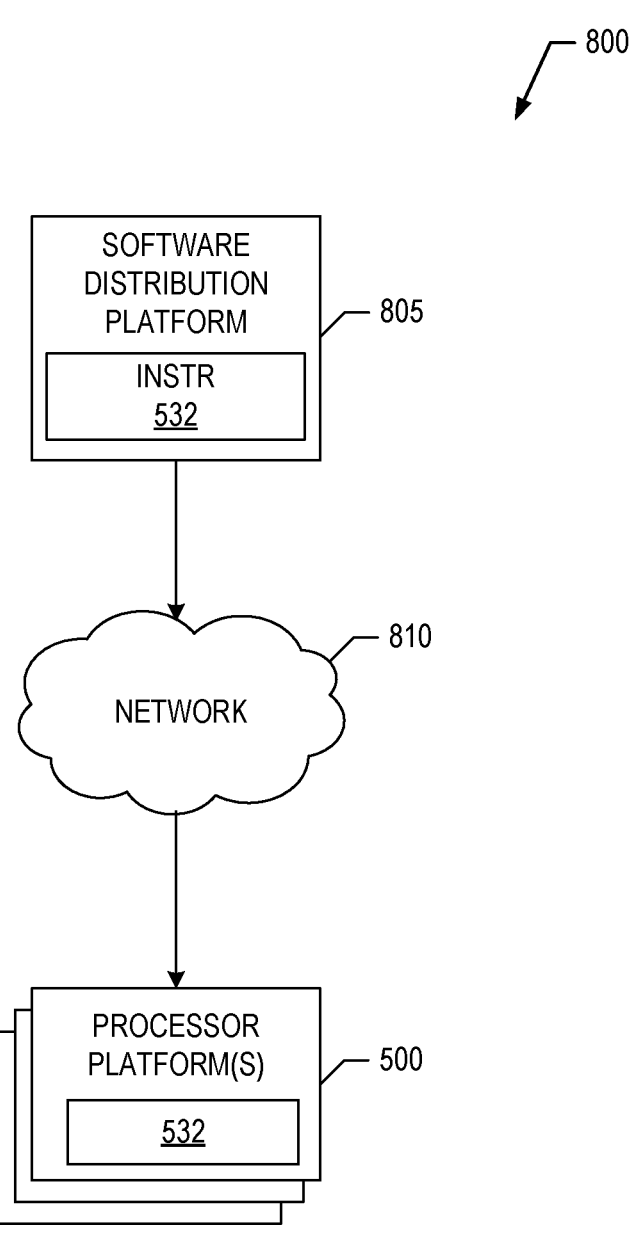
FIG. 8 is a block diagram of an example software distribution platform (e.g., one or more servers) to distribute software (e.g., software corresponding to the example machine readable instructions of FIGS. 3 and/or 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532 of FIG. 5, which may correspond to the example machine readable instructions 300 and/or 315 of FIGS. 3 and/or 4, as described above. The one or more servers of the example software distribution platform 805 are in communication with a network 810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 300 and/or 315 of FIGS. 3 and/or 4 may be downloaded to the example processor platform 500 which is to execute the machine readable instructions 532 to implement the container verification circuitry 110. In some example, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that permit container attestation in client-based workloads. Examples disclosed herein allow for the configuration of policy files which block some workloads from running on client platform(s). Examples disclosed herein control what technologies may be used (e.g., graphics processing unit) and/or are required (e.g., trust domain extension (TDX)) to execute container workloads. In examples disclosed herein, an enterprise IT department and/or an information security organization can use methods and apparatus disclosed herein to determine whether container workloads can be executed locally, instead of choosing to block all container workloads without exception. For example, methods and apparatus disclosed herein verify signed claims (e.g., attestation) about the container workload and reconcile the claims against an owner's policy prior to workload execution on a local platform. As such, an owner's policy can be enforced and, if the workload is allowed to execute, resource limits are applied during container workload execution. In this manner, protection from malware and/or other vulnerabilities is increased. Disclosed systems, methods, apparatus, and articles of manufacture are accordingly directed to one or more improvement(s) in the operation of a machine such as a computer or other electronic and/or mechanical device Example methods, apparatus, systems, and articles of manufacture for container attestation in client-based workloads are disclosed herein. Further examples and combinations thereof include the following:

Example 1 includes an apparatus for container attestation, comprising at least one memory, machine readable instructions, and processor circuitry to at least one of instantiate or execute the machine readable instructions to access a container attestation and an owner policy, the container attestation including a first signature and the owner policy including a second signature, determine that the first signature and the second signature are valid, iterate through configuration sets of the owner policy to identify a match between a claim of the container attestation and a configuration set, identify a resource constraint associated with the configuration set, and generate a resource description based on the resource constraint, the resource description to determine execution of a container workload on a client-based platform.

Example 2 includes the apparatus of example 1, wherein the processor circuitry is to output the resource description to at least one of an orchestrator engine or a container engine, the at least one of the orchestrator engine or the container engine to execute the container workload based on the resource constraint.

Example 3 includes the apparatus of example 2, wherein the processor circuitry is to normalize the resource constraint prior to passing the resource constraint to the orchestrator engine or the container engine.

Example 4 includes the apparatus of example 1, wherein the resource constraint is at least one of a random access memory (RAM) constraint or a trust domain constraint.

Example 5 includes the apparatus of example 1, wherein the container attestation includes a collection of claims of a container image, the collection of claims including at least one of an identify of an attestor, results of a vulnerability scan, or a cryptographic hash of the container image.

Example 6 includes the apparatus of example 1, wherein the owner policy includes a collection of policy statements, the collection of policy statements including at least one of a matching criteria or the resource constraint.

Example 7 includes the apparatus of example 1, wherein the processor circuitry is to block execution of the container workload when the first signature or the second signature is invalid.

Example 8 includes a method for container attestation, comprising obtaining container attestation and owner policy, the container attestation including a first signature and the owner policy including a second signature, verifying, by executing an instruction with one or more processors, a validity of the first signature and the second signature, when the first signature and the second signature are valid, iterating, by executing an instruction with the one or more processors, through configuration sets of the owner policy to identify a match between a claim of the container attestation and a configuration set, identifying, by executing an instruction with the one or more processors, a resource constraint associated with the configuration set, and generating, by executing an instruction with the one or more processors, a resource description based on the resource constraint, the resource description to determine execution of a container workload on a client-based platform.

Example 9 includes the method of example 8, further including outputting the resource description to at least one of an orchestrator engine or a container engine, the at least one of the orchestrator engine or the container engine to execute the container workload based on the resource constraint.

Example 10 includes the method of example 9, further including normalizing the resource constraint prior to passing the resource constraint to the at least one of the orchestrator engine or the container engine.

Example 11 includes the method of example 8, wherein the resource constraint is at least one of a random access memory (RAM) constraint or a trust domain constraint.

Example 12 includes the method of example 8, wherein the container attestation includes a collection of claims of a container image, the collection of claims including at least one of an identify of an attestor, results of a vulnerability scan, or a cryptographic hash of the container image.

Example 13 includes the method of example 8, wherein the owner policy includes a collection of policy statements, the collection of policy statements including at least one of a matching criteria or the resource constraint.

Example 14 includes the method of example 8, further including blocking execution of the container workload when at least one of the first signature or the second signature is invalid.

Example 15 includes a non-transitory machine readable storage medium comprising instructions that, when executed, cause processor circuitry to at least verify a validity of a first signature of a container attestation and a second signature of an owner policy, identify, when the first signature and the second signature are valid, a match between the container attestation and a configuration set of the owner policy, identify a resource constraint associated with the configuration set, and generate a resource description based on the resource constraint, the resource description to determine execution of a container workload on a client-based platform.

Example 16 includes the non-transitory machine readable storage medium of example 15, wherein the instructions, when executed, cause the processor circuitry to cause output of the resource description to at least one of an orchestrator engine or a container engine, the at least one of the orchestrator engine or the container engine to execute the container workload based on the resource constraint.

Example 17 includes the non-transitory machine readable storage medium of example 16, wherein the instructions, when executed, cause the processor circuitry to normalize the resource constraint.

Example 18 includes the non-transitory machine readable storage medium of example 15, wherein the resource constraint is at least one of a random access memory (RAM) constraint or a trust domain constraint.

Example 19 includes the non-transitory machine readable storage medium of example 15, wherein the container attestation includes a collection of claims of a container image, the collection of claims including at least one of an identify of an attestor, results of a vulnerability scan, or a cryptographic hash of the container image.

Example 20 includes the non-transitory machine readable storage medium of example 15, wherein the owner policy includes a collection of policy statements, the collection of policy statements including at least one of a matching criteria or the resource constraint.

Example 21 includes the non-transitory machine readable storage medium of example 15, wherein the instructions, when executed, cause the processor circuitry to block execution of the container workload when at least one of the first signature or the second signature is invalid.

Example 22 includes an apparatus for container attestation, comprising interface circuitry, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate container attestation receiver circuitry to access a container attestation and an owner policy, the container attestation including a first signature and the owner policy including a second signature, signature verifier circuitry to determine that the first signature and the second signature are valid, and configuration matcher circuitry to iterate through configuration sets of the owner policy to identify a match between a claim of the container attestation and a configuration set, parsing initiator circuitry to identify a resource constraint associated with the configuration set, and resource description generator circuitry to generate a resource description based on the resource constraint, the resource description to determine execution of a container workload on a client-based platform.

Example 23 includes the apparatus of example 22, wherein the resource description generator circuitry is to output the resource description to at least one of an orchestrator engine or a container engine, the at least one of the orchestrator engine or the container engine to execute the container workload based on the resource constraint.

Example 24 includes the apparatus of example 23, wherein parsing initiator circuitry is to normalize the resource constraint prior to passing the resource constraint to the orchestrator engine or the container engine.

Example 25 includes the apparatus of example 22, wherein the resource constraint is at least one of a random access memory (RAM) constraint or a trust domain constraint.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for container attestation, comprising:
at least one memory;
machine readable instructions; and
processor circuitry to at least one of instantiate or execute the machine readable instructions to:
    access a container attestation and an owner policy, the container attestation including a first signature and the owner policy including a second signature;
    determine that the first signature and the second signature are valid;
    iterate through configuration sets of the owner policy to identify a match between a claim of the container attestation and a configuration set;
    identify a resource constraint associated with the configuration set; and
    generate a resource description based on the resource constraint, the resource description to determine execution of a container workload on a client-based platform,
    wherein the container attestation includes a collection of claims of a container image, the collection of claims including at least one of an identity of an attestor, results of a vulnerability scan, or a cryptographic hash of the container image,
    wherein the owner policy includes a collection of policy statements, including at least one of (1) a criteria used to match claims in the container attestation, or (2) the resource constraint to implement during execution of the container workload.

2. The apparatus of claim 1, wherein the processor circuitry is to output the resource description to at least one of an orchestrator engine or a container engine, the at least one of the orchestrator engine or the container engine to execute the container workload based on the resource constraint.

3. The apparatus of claim 2, wherein the processor circuitry is to normalize the resource constraint prior to passing the resource constraint to the orchestrator engine or the container engine.

4. The apparatus of claim 1, wherein the resource constraint is at least one of a random access memory (RAM) constraint or a trust domain constraint.

5. The apparatus of claim 1, wherein the processor circuitry is to block execution of the container workload when the first signature or the second signature is invalid.

6. A method for container attestation, comprising:
obtaining container attestation and owner policy, the container attestation including a first signature and the owner policy including a second signature;
verifying, by executing an instruction with one or more processors, a validity of the first signature and the second signature;
when the first signature and the second signature are valid, iterating, by executing an instruction with the one or more processors, through configuration sets of the owner policy to identify a match between a claim of the container attestation and a configuration set;
identifying, by executing an instruction with the one or more processors, a resource constraint associated with the configuration set; and
generating, by executing an instruction with the one or more processors, a resource description based on the resource constraint, the resource description to determine execution of a container workload on a client-based platform,
wherein the container attestation includes a collection of claims of a container image, the collection of claims including at least one of an identity of an attestor, results of a vulnerability scan, or a cryptographic hash of the container image,
wherein the owner policy includes a collection of policy statements, including at least one of (1) a criteria used to match claims in the container attestation, or (2) the resource constraint to implement during execution of the container workload.

7. The method of claim 6, further including outputting the resource description to at least one of an orchestrator engine or a container engine, the at least one of the orchestrator engine or the container engine to execute the container workload based on the resource constraint.

8. The method of claim 7, further including normalizing the resource constraint prior to passing the resource constraint to the at least one of the orchestrator engine or the container engine.

9. The method of claim 6, wherein the resource constraint is at least one of a random access memory (RAM) constraint or a trust domain constraint.

10. The method of claim 6, further including blocking execution of the container workload when at least one of the first signature or the second signature is invalid.

11. A non-transitory machine readable storage medium comprising instructions that, when executed, cause processor circuitry to at least:
verify a validity of a first signature of a container attestation and a second signature of an owner policy;

identify, when the first signature and the second signature are valid, a match between a claim of the container attestation and a configuration set of the owner policy;

identify a resource constraint associated with the configuration set; and generate a resource description based on the resource constraint, the resource description to determine execution of a container workload on a client-based platform, wherein the container attestation includes a collection of claims of a container image, the collection of claims including at least one of an identity of an attestor, results of a vulnerability scan, or a cryptographic hash of the container image, wherein the owner policy includes a collection of policy statements, including at least one of (1) a criteria used to match claims in the container attestation, or (2) the resource constraint to implement during execution of the container workload.

12. The non-transitory machine readable storage medium of claim 11, wherein the instructions, when executed, cause the processor circuitry to cause output of the resource description to at least one of an orchestrator engine or a container engine, the at least one of the orchestrator engine or the container engine to execute the container workload based on the resource constraint.

13. The non-transitory machine readable storage medium of claim 12, wherein the instructions, when executed, cause the processor circuitry to normalize the resource constraint.

14. The non-transitory machine readable storage medium of claim 11, wherein the resource constraint is at least one of a random access memory (RAM) constraint or a trust domain constraint.

15. The non-transitory machine readable storage medium of claim 11, wherein the instructions, when executed, cause the processor circuitry to block execution of the container workload when at least one of the first signature or the second signature is invalid.

16. An apparatus for container attestation, comprising:

interface circuitry; and processor circuitry including one or more of:

at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;

a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or Application Specific Integrated Circuitry (ASIC) including logic gate circuitry to perform one or more third operations;

the processor circuitry to perform at least one of the first operations, the second operations, or the third operations to instantiate:

container attestation receiver circuitry to access a container attestation and an owner policy, the container attestation including a first signature and the owner policy including a second signature;

signature verifier circuitry to determine that the first signature and the second signature are valid; and configuration matcher circuitry to iterate through configuration sets of the owner policy to identify a match between a claim of the container attestation and a configuration set;

parsing initiator circuitry to identify a resource constraint associated with the configuration set; and resource description generator circuitry to generate a resource description based on the resource constraint, the resource description to determine execution of a container workload on a client-based platform, wherein the container attestation includes a collection of claims of a container image, the collection of claims including at least one of an identity of an attestor, results of a vulnerability scan, or a cryptographic hash of the container image, wherein the owner policy includes a collection of policy statements, including at least one of (1) a criteria used to match claims in the container attestation, or (2) the resource constraint to implement during execution of the container workload.

17. The apparatus of claim 16, wherein the resource description generator circuitry is to output the resource description to at least one of an orchestrator engine or a container engine, the at least one of the orchestrator engine or the container engine to execute the container workload based on the resource constraint.

18. The apparatus of claim 17, wherein parsing initiator circuitry is to normalize the resource constraint prior to passing the resource constraint to the orchestrator engine or the container engine.

19. The apparatus of claim 16, wherein the resource constraint is at least one of a random access memory (RAM) constraint or a trust domain constraint.

* * * * *